(12) United States Patent
Miwa

(10) Patent No.: US 11,445,091 B2
(45) Date of Patent: Sep. 13, 2022

(54) IMAGE FORMING APPARATUS, INFORMATION PROCESSING APPARATUS, AND RECORDING MEDIUM

(71) Applicant: Ryotaro Miwa, Kanagawa (JP)

(72) Inventor: Ryotaro Miwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/444,303

(22) Filed: Aug. 3, 2021

(65) Prior Publication Data

US 2022/0060605 A1 Feb. 24, 2022

(30) Foreign Application Priority Data

Aug. 19, 2020 (JP) .............................. JP2020-138885
Jun. 16, 2021 (JP) .............................. JP2021-100091

(51) Int. Cl.
*H04N 1/60* (2006.01)
*H04N 1/00* (2006.01)

(52) U.S. Cl.
CPC ......... *H04N 1/6027* (2013.01); *H04N 1/0061* (2013.01); *H04N 1/00602* (2013.01); *H04N 1/6044* (2013.01)

(58) Field of Classification Search
CPC ............. H04N 1/00602; H04N 1/0061; H04N 1/6027; H04N 1/00037; H04N 1/00005; H04N 1/00013; H04N 1/0035; H04N 1/00389; H04N 1/0057; H04N 1/00588; H04N 1/00681; H04N 1/00713; H04N 1/00724; H04N 1/00745; H04N 1/203; H04N 1/32128; H04N 1/40; H04N 2201/0081; H04N 2201/0094; H04N 2201/0434; H04N 2201/3225; H04N 2201/3232; B65H 2513/50; B65H 2701/1311; B65H 2701/1313; B65H 7/18; B65H 2220/11; B65H 2511/414; B65H 2513/40; B65H 2513/514; B65H 2801/06; B65H 2801/39; B65H 3/0607; B65H 3/0684; B65H 3/5261; B65H 7/14; G03G 15/607
USPC ......................................................... 358/1.9
See application file for complete search history.

(56) References Cited

U.S. PATENT DOCUMENTS

| 5,819,038 A * | 10/1998 | Carleton | ............... H04L 65/403 |
| | | | 348/E7.083 |
| 10,389,919 B2 | 8/2019 | Miwa | |
| 10,757,280 B2 * | 8/2020 | Inage | ................. H04N 1/00793 |

(Continued)

FOREIGN PATENT DOCUMENTS

JP 6269208 1/2018

*Primary Examiner* — Negussie Worku
(74) *Attorney, Agent, or Firm* — IPUSA, PLLC

(57) ABSTRACT

An image forming apparatus includes an image former configured to form a first image on a first recording medium; a feeder configured to feed the first recording medium to the image former; a reader configured to read the first image formed on the first recording medium; a process executor configured to execute a predetermined process based on a first read image that is obtained by the reader by reading the first image; and a corrector configured to correct the reader based on a second read image that is obtained by the reader by reading a second image formed on a second recording medium fed by the feeder, and a predetermined read reference image.

13 Claims, 14 Drawing Sheets

(56) References Cited

U.S. PATENT DOCUMENTS

| | | | |
|---|---|---|---|
| 2010/0157375 A1* | 6/2010 | Murakami | H04N 1/4095 358/3.26 |
| 2010/0271645 A1* | 10/2010 | Nakabayashi | H04N 1/32128 358/448 |
| 2011/0096191 A1* | 4/2011 | Nagamine | H04N 17/02 382/167 |
| 2012/0314267 A1* | 12/2012 | Suzuki | B65H 3/5261 271/10.03 |
| 2013/0114102 A1* | 5/2013 | Yamamoto | G06V 10/245 358/1.14 |
| 2014/0111832 A1* | 4/2014 | Hayashi | H04N 1/603 358/3.06 |
| 2015/0268896 A1 | 9/2015 | Hayashi | |
| 2017/0126911 A1* | 5/2017 | Kogi | H04N 1/0035 |
| 2019/0166271 A1* | 5/2019 | Yamazaki | B65H 7/02 |
| 2019/0166275 A1* | 5/2019 | Ishii | H04N 1/1235 |
| 2019/0327387 A1* | 10/2019 | Hashimoto | H04N 1/605 |
| 2020/0391516 A1* | 12/2020 | Date | G01J 3/46 |
| 2021/0006664 A1 | 1/2021 | Miwa | |

* cited by examiner

| PATCH IMAGE | NO | CMYK_C | READ RESULT | | | COLORIMETRIC RESULT | | | | | |
|---|---|---|---|---|---|---|---|---|---|---|---|
| | | | R | G | B | X | Y | Z | L* | a* | b* |
| | 1 | 0 | 3658 | 3597 | 3609 | 3168 | 3257 | 2696 | 92.31781 | 1.3502 | -0.2012 |
| | 2 | 0.0039 | 3640 | 3571 | 3593 | 3160 | 3251 | 2697 | 92.25237 | 1.251381 | -0.33218 |
| | 3 | 0.0118 | 3655 | 3603 | 3622 | 3155 | 3247 | 2696 | 92.2138 | 1.174775 | -0.38139 |
| | 4 | 0.0235 | 3637 | 3593 | 3634 | 3130 | 3228 | 2698 | 92.00287 | 0.825049 | -0.79092 |
| | 5 | 0.0392 | 3604 | 3572 | 3627 | 3116 | 3221 | 2709 | 91.91513 | 0.552051 | -1.19767 |
| | 6 | 0.0588 | 3567 | 3544 | 3617 | 3093 | 3202 | 2708 | 91.70897 | 0.25785 | -1.51196 |
| | 7 | 0.0824 | 3476 | 3492 | 3607 | 3036 | 3156 | 2708 | 91.1898 | -0.37946 | -2.42616 |
| | 8 | 0.1098 | 3359 | 3437 | 3620 | 2944 | 3081 | 2696 | 90.33364 | -1.36032 | -3.62079 |
| | 9 | 0.1569 | 3136 | 3289 | 3569 | 2821 | 2979 | 2670 | 89.14384 | -2.72826 | -5.06814 |
| | 10 | 0.2157 | 2941 | 3170 | 3542 | 2691 | 2868 | 2654 | 87.81988 | -4.03815 | -6.97715 |
| | 11 | 0.2745 | 2680 | 3000 | 3496 | 2504 | 2706 | 2619 | 85.83549 | -6.00129 | -9.58446 |
| | 12 | 0.3333 | 2408 | 2822 | 3444 | 2303 | 2528 | 2570 | 83.55293 | -8.07066 | -12.3558 |
| | 13 | 0.3922 | 2167 | 2651 | 3386 | 2121 | 2362 | 2532 | 81.31777 | -9.83985 | -15.298 |
| | 14 | 0.451 | 1995 | 2528 | 3336 | 2012 | 2264 | 2505 | 79.95107 | -11.0783 | -16.997 |
| | 15 | 0.5098 | 1761 | 2351 | 3259 | 1831 | 2097 | 2460 | 77.52807 | -13.1159 | -20.0682 |
| | 16 | 0.5686 | 1489 | 2150 | 3177 | 1608 | 1885 | 2387 | 74.27536 | -15.5876 | -23.8774 |
| | 17 | 0.6275 | 1248 | 1955 | 3081 | 1423 | 1712 | 2322 | 71.41801 | -18.1778 | -27.1582 |
| | 18 | 0.7059 | 979 | 1726 | 2955 | 1209 | 1505 | 2244 | 67.74935 | -21.3112 | -31.4705 |
| | 19 | 0.8039 | 672 | 1453 | 2803 | 946 | 1241 | 2132 | 62.52219 | -25.432 | -37.4946 |
| | 20 | 0.902 | 430 | 1205 | 2639 | 721 | 996 | 2002 | 56.98902 | -28.7327 | -43.4584 |
| | 21 | 1 | 158 | 918 | 2429 | 468 | 720 | 1851 | 49.4907 | -34.7131 | -52.0145 |

FIG.12

| PATCH IMAGE | | | READ RESULT | | | COLORIMETRIC RESULT | | | | | | READ RESULT BY IN-LINE SENSOR OF IMAGE FORMING APPARATUS B | | |
|---|---|---|---|---|---|---|---|---|---|---|---|---|---|---|
| | NO | CMYK_C | R | G | B | X | Y | Z | L* | a* | b* | R | G | B |
| | 1 | 0 | 3658 | 3597 | 3609 | 3168 | 3257 | 2696 | 92.31781 | 1.3502 | -0.2012 | 3642 | 3678 | 3603 |
| | 2 | 0.0039 | 3640 | 3571 | 3593 | 3160 | 3251 | 2697 | 92.25237 | 1.251381 | -0.33218 | 3618 | 3643 | 3582 |
| | 3 | 0.0118 | 3655 | 3603 | 3622 | 3155 | 3247 | 2696 | 92.2138 | 1.174775 | -0.38139 | 3623 | 3633 | 3615 |
| | 4 | 0.0235 | 3637 | 3593 | 3634 | 3130 | 3228 | 2698 | 92.00287 | 0.825049 | -0.79092 | 3612 | 3612 | 3625 |
| | 5 | 0.0392 | 3604 | 3572 | 3627 | 3116 | 3221 | 2709 | 91.91513 | 0.552051 | -1.19767 | 3589 | 3598 | 3621 |
| | 6 | 0.0588 | 3567 | 3544 | 3617 | 3093 | 3202 | 2708 | 91.70897 | 0.25785 | -1.51196 | 3543 | 3567 | 3609 |
| | 7 | 0.0824 | 3476 | 3492 | 3607 | 3036 | 3156 | 2708 | 91.1898 | -0.37946 | -2.42616 | 3456 | 3523 | 3592 |
| | 8 | 0.1098 | 3359 | 3437 | 3620 | 2944 | 3081 | 2696 | 90.33364 | -1.36032 | -3.62079 | 3332 | 3459 | 3611 |
| | 9 | 0.1569 | 3136 | 3289 | 3569 | 2821 | 2979 | 2670 | 89.14384 | -2.72826 | -5.06814 | 3112 | 3309 | 3551 |
| | 10 | 0.2157 | 2941 | 3170 | 3542 | 2691 | 2868 | 2654 | 87.81988 | -4.03815 | -6.97715 | 2908 | 3198 | 3527 |
| | 11 | 0.2745 | 2680 | 3000 | 3496 | 2504 | 2706 | 2619 | 85.83549 | -6.00129 | -9.58446 | 2656 | 3057 | 3478 |
| | 12 | 0.3333 | 2408 | 2822 | 3444 | 2303 | 2528 | 2570 | 83.55293 | -8.07066 | -12.3558 | 2386 | 2852 | 3431 |
| | 13 | 0.3922 | 2167 | 2651 | 3386 | 2121 | 2362 | 2532 | 81.31777 | -9.83985 | -15.298 | 2123 | 2687 | 3367 |
| | 14 | 0.451 | 1995 | 2528 | 3336 | 2012 | 2264 | 2505 | 79.95107 | -11.0783 | -16.997 | 1965 | 2557 | 3315 |
| | 15 | 0.5098 | 1761 | 2351 | 3259 | 1831 | 2097 | 2460 | 77.52807 | -13.1159 | -20.0682 | 1719 | 2389 | 3240 |
| | 16 | 0.5686 | 1489 | 2150 | 3177 | 1608 | 1885 | 2387 | 74.27536 | -15.5876 | -23.8774 | 1454 | 2182 | 3158 |
| | 17 | 0.6275 | 1248 | 1955 | 3081 | 1423 | 1712 | 2322 | 71.41801 | -18.1778 | -27.1582 | 1210 | 1978 | 3067 |
| | 18 | 0.7059 | 979 | 1726 | 2955 | 1209 | 1505 | 2244 | 67.74935 | -21.3112 | -31.4705 | 923 | 1757 | 2932 |
| | 19 | 0.8039 | 672 | 1453 | 2803 | 946 | 1241 | 2132 | 62.52219 | -25.432 | -37.4946 | 643 | 1489 | 2783 |
| | 20 | 0.902 | 430 | 1205 | 2639 | 721 | 996 | 2002 | 56.98902 | -28.7327 | -43.4584 | 406 | 1246 | 2621 |
| | 21 | 1 | 158 | 918 | 2429 | 468 | 720 | 1851 | 49.4907 | -34.7131 | -52.0145 | 112 | 942 | 2408 |

FIG.13

IMAGE FORMING APPARATUS, INFORMATION PROCESSING APPARATUS, AND RECORDING MEDIUM

CROSS-REFERENCE TO RELATED APPLICATION

The present application is based on and claims priority under 35 U.S.C. § 119 to Japanese Patent Application No. 2020-138885, filed on Aug. 19, 2020 and Japanese Patent Application No. 2021-100091, filed on Jun. 16, 2021, the contents of which are incorporated herein by reference in their entirety.

BACKGROUND OF THE INVENTION

1. Field of the Invention

The present invention relates to an image forming apparatus, an information processing apparatus, and a recording medium.

2. Description of the Related Art

Conventionally, in an image forming apparatus, there is known a technique of executing processes such as inspection of a print image, correction of an image forming unit or the like, based on an image obtained, by a reading unit such as an in-line sensor or the like, by reading a print image printed by the image forming unit. In this case, the image forming unit forms the print image on a recording medium fed from a feeding unit such as a sheet feeding tray, and the reading unit reads, by in-line, the print image immediately after the image formation.

On the other hand, there is disclosed a configuration for determining the reading characteristics of the reading unit in first and second image forming apparatuses, based on an image obtained, by the second image forming apparatus, by reading the print image printed by the first image forming apparatus (see, for example, Patent Document 1).

Patent Document 1: Japanese Unexamined Patent Application Publication No. 2015-176517

SUMMARY OF THE INVENTION

According to one aspect of the present invention, there is provided an image forming apparatus including an image former configured to form a first image on a first recording medium; a feeder configured to feed the first recording medium to the image former; a reader configured to read the first image formed on the first recording medium; a process executor configured to execute a predetermined process based on a first read image that is obtained by the reader by reading the first image; and a corrector configured to correct the reader based on a second read image that is obtained by the reader by reading a second image formed on a second recording medium fed by the feeder, and a predetermined read reference image.

BRIEF DESCRIPTION OF THE DRAWINGS

FIG. 12 is a diagram illustrating an example of read reference data in the image forming apparatus according to the third embodiment of the present invention;

FIG. 13 is a diagram illustrating an example of read reference data of another image forming apparatus according to the third embodiment of the present invention.

DETAILED DESCRIPTION OF THE PREFERRED EMBODIMENTS

Figure 1:
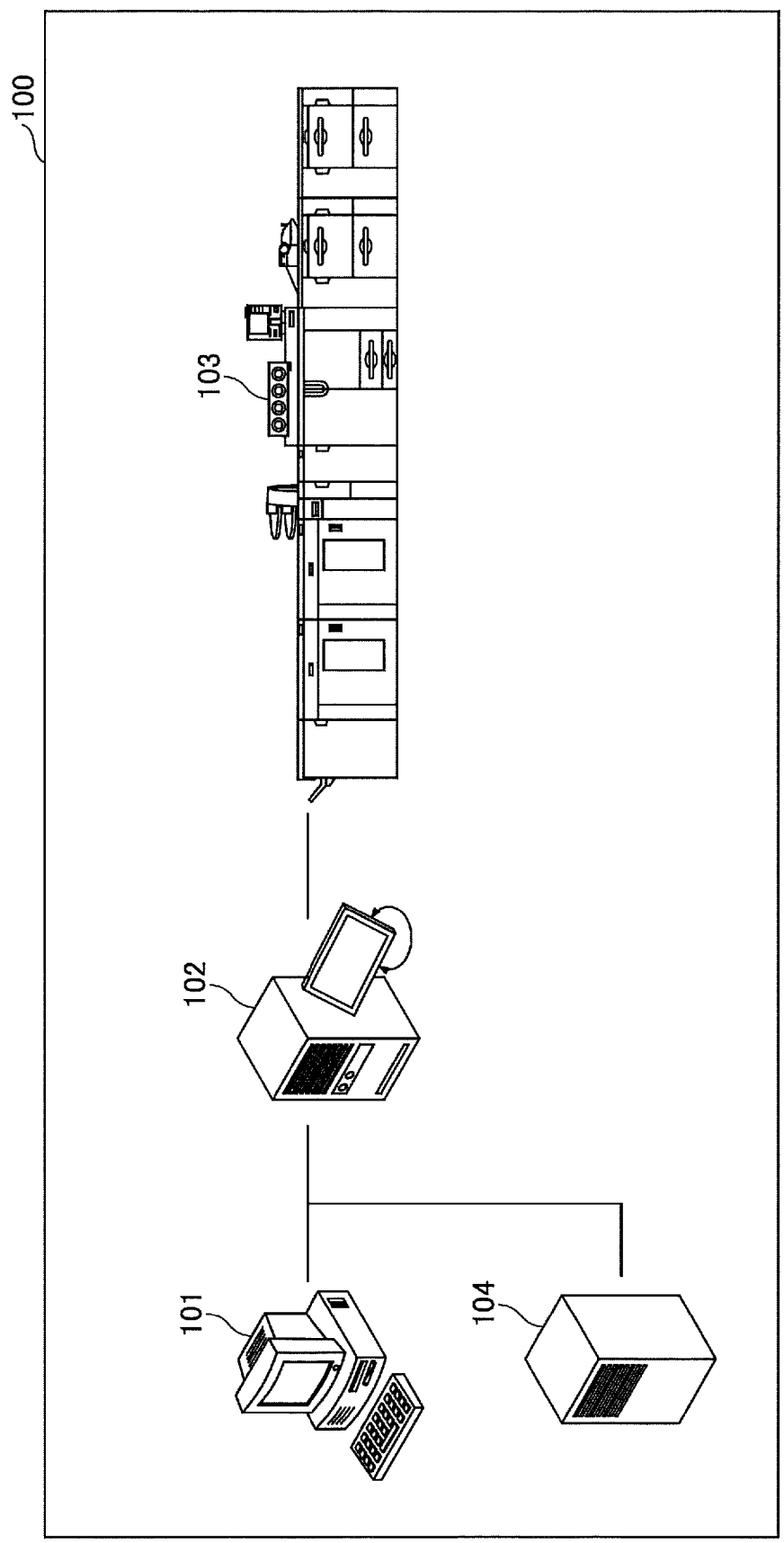
FIG. 1 is a diagram illustrating an example of configuration of an image forming system according to a first embodiment of the present invention.

In the configuration of Patent Document 1, the reading unit is for reading a print image using a document platen or an Auto Document Feeder (ADF). With this configuration, it is not possible to correct a reading unit, which is disposed in a conveying path at a stage after image formation, and which is for performing inspection of a print image, correction of the image forming unit, or the like.

A problem to be addressed by an embodiment of the present invention is to correct the reading unit accurately.

Hereinafter, an embodiment for carrying out the present invention will be described with reference to the drawings. In each drawing, the same elements are denoted by the same reference numerals, and overlapping descriptions are omitted accordingly.

The following embodiments are exemplary of an image forming apparatus for embodying the technical idea of the present invention, and the present invention is not limited to the following embodiments. Unless otherwise specified, the scope of the present invention is not intended to be limited only to the shapes of the elements, the relative arrangement of the elements, and the parameter values described below, but these elements are intended to be exemplary. Further, the size, positional relationship or the like of the members illustrated in the drawings may be exaggerated in some cases for the purpose of clarification of explanation.

The image forming apparatus according to the embodiment includes an image forming unit that forms a first image on a first recording medium, a feeding unit that is capable of feeding the first recording medium to the image forming unit, a reading unit that reads the first image formed on the first recording medium, and a process executing unit that executes a predetermined process based on a read image that is obtained by the reading unit by reading the first image.

The predetermined process is, for example, an inspection process of inspecting the first image, a color correction process of correcting the image forming unit at the time of non-image formation (when an image is not being formed), a color correction process of correcting the image forming unit at the time of image formation, or the like. The color correction process of the image forming unit at the time of non-image formation corresponds to a color calibration process or the like executed before the image is formed by the image forming apparatus. The color correction process of the image forming unit at the time of image formation includes a so-called real-time color correction process or the like executed during image formation.

In an embodiment, the reading unit is corrected based on a read image obtained by the reading unit by reading an image formed on the second recording medium fed by the feeding unit, and a predetermined read reference image. The second image is a correction chart image or the like for correcting the reading characteristics of the reading unit. The second image is an image that is formed in advance on the second recording medium by the image forming apparatus according to the embodiment or by another image forming apparatus different from the image forming apparatus according to the embodiment, or the like.

Similarly to the time of executing the predetermined process, by correcting the reading unit using the second image formed on the second recording medium fed by the feeding unit, the reading unit is accurately corrected in the same state as when the process executing unit executes a process.

Hereinafter, an embodiment will be described, by taking as an example, an image forming system including an image forming apparatus. The image forming system is, for example, an image forming system for commercial printing (production printing) in which a desired image is printed on a large amount of recording media. The terms "printing", "image forming", and "character printing" in the embodiments are synonymous.

<Example of Overall Configuration of an Image Forming System 100>

First, an example of the configuration of the image forming system 100 will be described with reference to FIG. 1. FIG. 1 is a diagram illustrating an example of a configuration of the image forming system 100. As illustrated in FIG. 1, the image forming system 100 includes a client personal computer (PC) 101, a Digital Front End (DFE) 102, an image forming apparatus 103, and a management server 104. These elements are communicably interconnected to each other via the Internet or the like.

The client PC 101 creates a print job that the user wants to print and transmits the print job to the DFE 102 or the management server 104. The client PC 101 is equipped with a display, which is a liquid crystal display, and input devices such as a mouse and keyboard.

The DFE 102 receives a print job from the client PC 101 or the management server 104, creates rendering data by a Raster Image Processor (RIP) engine based on the received print job, and transmits the rendering data to the image forming apparatus 103. Here, the DFE 102 is an example of an information processing apparatus.

The image forming apparatus 103 forms an image on a recording medium based on the rendering data received from the DFE 102.

The management server 104 manages a print job received from the client PC 101. At the request of the DFE 102, the management server 104 transmits the print job to the DFE 102.

A plurality of image forming apparatuses or a plurality of client PCs may be communicably connected to the image forming system 100.

<Example of Hardware Configuration of the DFE 102>

Figure 2:
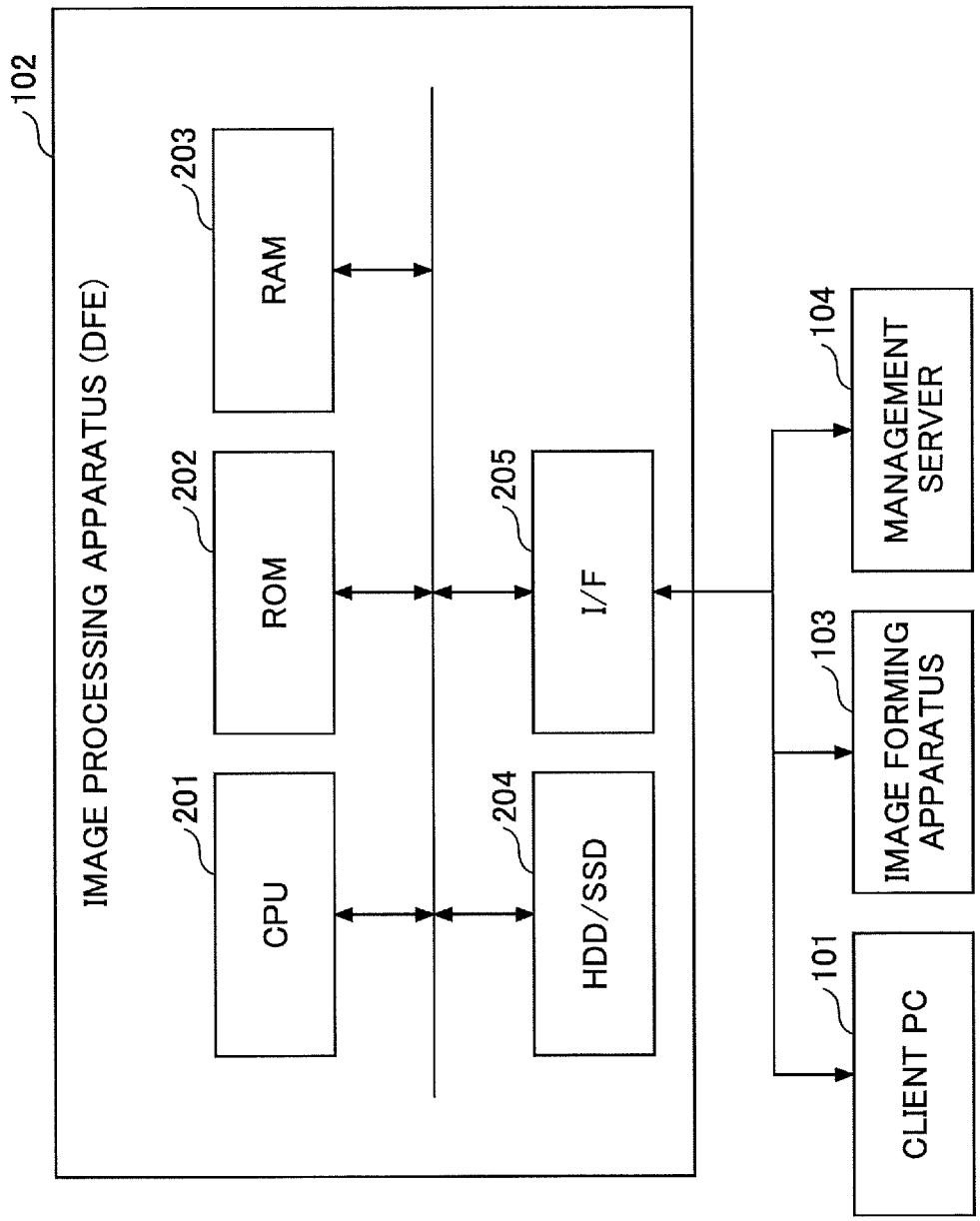
FIG. 2 is a block diagram illustrating an example of hardware configuration of an information processing apparatus according to the first embodiment of the present invention.

Referring now to FIG. 2, a hardware configuration of the DFE 102 will be described. FIG. 2 is a block diagram illustrating an example of a hardware configuration of the DFE 102.

As illustrated in FIG. 2, the DFE 102 includes a Central Processing Unit (CPU) 201, a Read Only Memory (ROM) 202, a Random Access Memory (RAM) 203, a Hard Disk (HDD)/Solid State Drive (SSD) 204, and an Interface (I/F) 205.

Among these, the CPU 201 controls the operation of the entire DFE 102 by using the RAM 203 as a working area and by executing a program stored in the ROM 202.

The HDD/SSD 204 is used as a storage unit and stores a preset setting value. The information stored in the HDD/SSD 204 may be used by the CPU 201 when executing a read program.

The I/F 205 is an interface that enables communication between the DFE 102 and the client PC 101, the image forming apparatus 103, and the management server 104.

<Example of Hardware Configuration of the Image Forming Apparatus 103>

Figure 3:
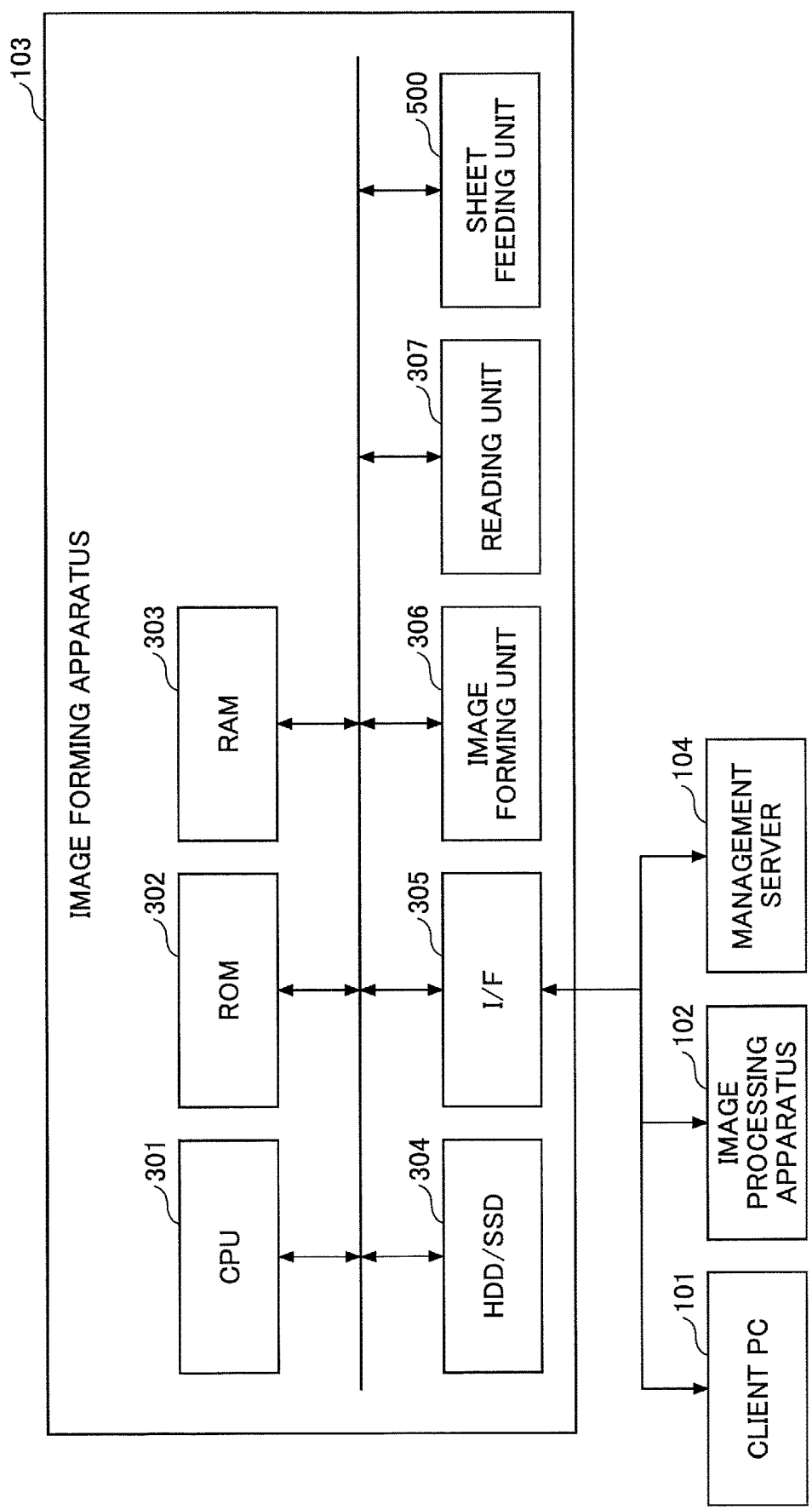
FIG. 3 is a block diagram illustrating an example of hardware configuration of an image forming apparatus according to the first embodiment of the present invention.

Next, the hardware configuration of the image forming apparatus 103 will be described with reference to FIG. 3. FIG. 3 is a block diagram illustrating an example of a hardware configuration of the image forming apparatus 103.

As illustrated in FIG. 3, the image forming apparatus 103 includes a CPU 301, a ROM 302, a RAM 303, a HDD/SSD 304, an I/F 305, an image forming unit 306, a reading unit 307, and a sheet feeding unit 500.

Among these, the CPU 301 controls the operation of the entire image forming apparatus 103 by using the RAM 303 as the work area and by executing a program stored in the ROM 302.

The HDD/SSD 304 is used as a storage unit and stores a preset setting value. The information stored in the HDD/SSD 304 may be used by the CPU 301 when executing a read program.

The I/F 305 is an interface that enables communication between the image forming apparatus 103 and the DFE 102, the client PC 101, and the management server 104.

The image forming unit 306 (an example of an image former) is a printing engine that forms a print image on a print sheet. Here, the print sheet is an example of a first recording medium and the print image is an example of a first image. The reading unit 307 (an example of a reader) is a reading device for reading the print image formed on the print sheet. The sheet feeding unit 500 is an example of a feeding unit (a feeder) capable of feeding the print sheet to the image forming unit 306.

<Configuration Example of the Image Forming Apparatus 103>

Figure 4:
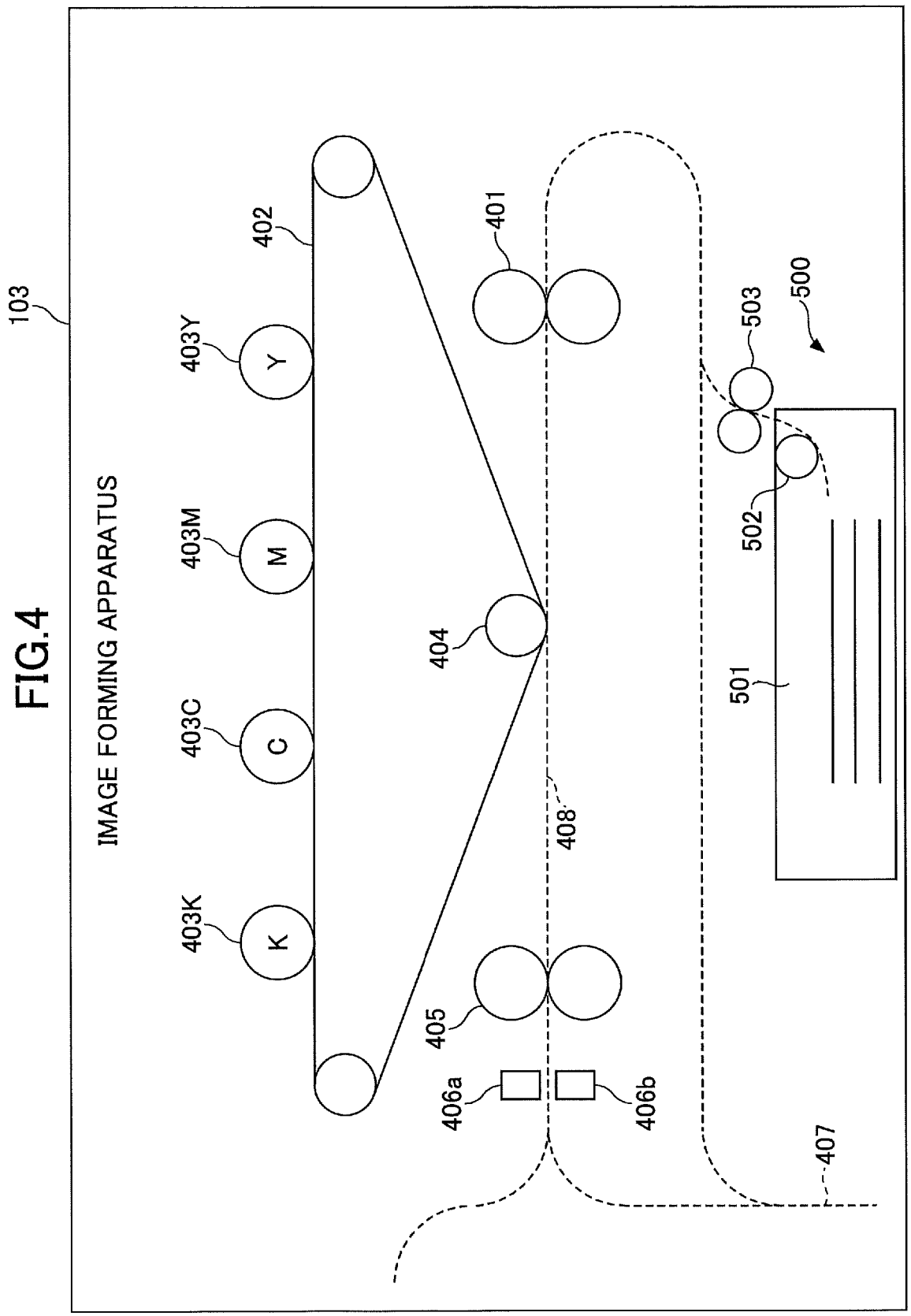
FIG. 4 is a diagram illustrating an example of configuration of the image forming apparatus according to the first embodiment of the present invention.

Next, a configuration of the image forming apparatus 103 will be described with reference to FIG. 4. FIG. 4 is a diagram illustrating an example of the configuration of the image forming apparatus 103. As illustrated in FIG. 4, the image forming apparatus 103 includes tandem type electrophotographic photoconductor drums 403K, 403C, 403M, and 403Y, an intermediate transfer belt 402, a secondary transfer roller 404, a sheet feeding unit 500, a pair of conveying rollers 401, a fixing roller 405, in-line sensors 406a and 406b, a reverse path 407, and a conveying path 408.

The image forming unit 306 of FIG. 3 includes the photoconductor drums 403K, 403C, 403M, and 403Y, the intermediate transfer belt 402, the secondary transfer roller 404, and the fixing roller 405. Further, the reading unit 307 of FIG. 3 includes the in-line sensors 406a and 406b.

The image forming apparatus 103 is a so-called tandem-type image forming apparatus having a configuration in which the photoconductor drums 403Y, 403M, 403C, and 403K (hereinafter, generally referred to as the photoconductor drum 403) of the respective colors are arranged along the intermediate transfer belt 402 that is an endless moving means. The photoconductor drums 403Y, 403M, 403C, and 403K are arranged in the stated order starting from the upstream side of the conveying direction of the intermediate transfer belt 402, along the intermediate transfer belt 402 on which an intermediate transfer image is formed. The intermediate transfer image is to be transferred to a print sheet (an example of a first recording medium) fed from the sheet feeding unit 500 and conveyed by the pair of conveying rollers 401.

The image forming apparatus 103 forms a full color image, by superimposing and transferring the images of the respective colors developed with toner on the surface of the photoconductor drums 403 of the respective colors, onto the intermediate transfer belt 402. Here, the intermediate transfer belt 402 is an example of an image bearer for carrying an image.

The image forming apparatus 103 transfers, by the function of the secondary transfer roller 404, the full color image formed on the intermediate transfer belt 402 onto a print sheet that has been conveyed along the conveying path 408 of the print sheet illustrated in the figure with a broken line. The full color image is transferred from the intermediate transfer belt 402 onto the print sheet at a position closest to the conveying path 408.

The image forming apparatus 103 further conveys the print sheet on which an image has been formed, and fixes the image to the print sheet by the fixing roller 405 (image formation). The fixing roller 405 is an example of a fixing unit (a fixer) for thermally fixing a print image to a print sheet. The fixing roller 405 fixes the full color toner image onto the print sheet by heating and pressing the print sheet on which the full color toner image has been transferred. The fixing roller 405 generates heat by a heater, such as a halogen heater built into the fixing roller 405, so that the print sheet can be heated.

When double-sided printing is performed, the image forming apparatus 103 forms an image on the front side of the print sheet, and then conveys the print sheet to the reverse path 407 in the conveying path 408, reverses the front and back sides of the print sheet, and then conveys the print sheet to the position of the secondary transfer roller 404 again.

The sheet feeding unit 500 includes a sheet feeding tray 501, a pick-up roller 502, and a pair of sheet feeding rollers 503. The sheet feeding tray 501 is an example of an accommodating unit (an accommodator) that can accommodate the print sheet.

The sheet feeding tray 501 accommodates a plurality of print sheets in a stack. The first recording medium includes, but is not limited to, a print sheet, such as a recording sheet (transfer sheet), and may include coated paper, cardboard, an overhead projector (OHP) sheet, a plastic film, prepreg, copper foil, or the like, as long as an image can be formed (recorded) on the medium.

The sheet feeding unit 500 sequentially picks up, by the pick-up roller 502, the print sheets stacked and accommodated in the sheet feeding tray 501 starting from the top sheet, and feeds the picked-up print sheet to the pair of conveying rollers 401 using the pair of sheet feeding rollers 503. The sheet feeding unit 500 may have a configuration that includes other rollers for conveying sheets.

The image forming apparatus 103 includes the in-line sensors 406a and 406b (hereinafter, generally referred to as the in-line sensor 406) at the downstream side of the fixing roller 405 in the conveying direction of the print sheet.

The in-line sensor 406 reads both sides of the print sheet conveyed by the fixing roller 405 and obtains the read image data of an image that is fixed on the print sheet. Note that the number of the in-line sensors 406 does not necessarily need to be two (406a, 406b), and there may be only one in-line sensor 406a. When there is only one in-line sensor 406a, reading is performed only by the in-line sensor 406a at the time point when an image is formed on the front side of the print sheet. Subsequently, the image forming apparatus 103 forms an image on the back side of the print sheet.

Here, the in-line sensor 406 is a Charge Coupled Device (CCD) line sensor in which pixels, which output electrical signals in accordance with the received light intensity, are arranged in a one-dimensional array. The array direction of the pixels intersects the conveying direction of the print sheet. The in-line sensor 406 includes a pixel array for receiving red light (R), a pixel array for receiving green light (G), and a pixel array for receiving blue light (B).

The in-line sensor 406 outputs, by the pixel array of each color, an electrical signal according to the light intensity of the reflected light from the print image formed on the print sheet. The image forming apparatus 103 uses the light intensity (density) of each color of the read image read by the in-line sensor 406, as color information, to correct the print color.

The in-line sensor 406 may include a light source for irradiating the print sheet with light. By irradiating the print sheet from the light source, it is possible to ensure brightness when the in-line sensor 406 performs the reading. The in-line sensor 406 may also include a Complementary Metal-Oxide-Semiconductor (CMOS) or a Photo Diode (PD) array or the like, in place of the CCD.

<Example of Functional Configuration of the Image Forming Apparatus 103>

Figure 5:
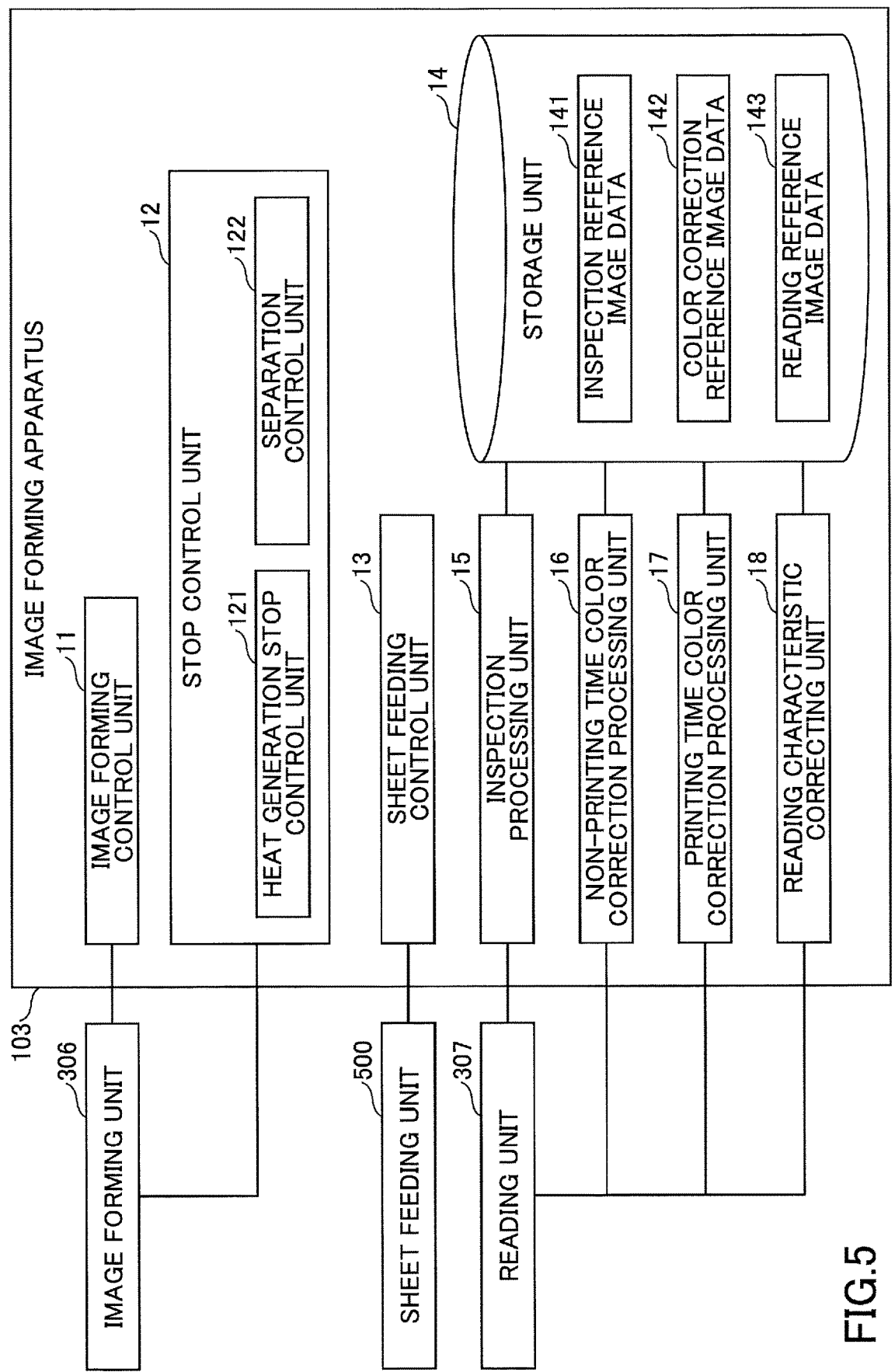
FIG. 5 is a block diagram illustrating an example of functional configuration of the image forming apparatus according to the first embodiment of the present invention.

Next, the functional configuration of the image forming apparatus 103 will be described with reference to FIG. 5 and also to the configuration diagram of FIG. 4, as appropriate. FIG. 5 is a block diagram illustrating an example of a functional configuration of the image forming apparatus 103. As illustrated in FIG. 5, the image forming apparatus 103 includes an image forming control unit 11, a stop control unit 12, a sheet feeding control unit 13, a storage unit 14, an inspection processing unit 15, a non-printing time color correction processing unit 16, a printing time color correction processing unit 17, and a reading characteristic correcting unit 18. Among these, the function of the storage unit 14 is implemented by the HDD/SSD 304 or the like. The functions of the elements other than the storage unit 14 are implemented by executing a predetermined program or the like by the CPU 301 of FIG. 3. Although only the main elements are illustrated in FIG. 5, the image forming apparatus 103 may include other elements.

The image forming control unit 11 has a function of controlling an image forming operation by the image forming unit 306.

The stop control unit 12 (a stop controller) has a function to stop the operation of the image forming unit 306 when the reading characteristic correcting unit 18 corrects the reading characteristic of the reading unit 307.

The stop control unit 12 includes a heat generation stop control unit 121 and a separation control unit 122. The heat generation stop control unit 121 stops the heat generation of the fixing roller 405 in the image forming unit 306. The separation control unit 122 can cause the intermediate transfer belt 402 to be separated from the conveying path 408 on which the print sheet is conveyed.

The sheet feeding control unit 13 has a function to control the operation of the sheet feeding unit 500.

The storage unit 14 stores inspection reference image data 141 used by the inspection processing unit 15, color correction reference data 142 used by the non-printing time color correction processing unit 16 and the printing time color correction processing unit 17, and read reference image data 143 used by the reading characteristic correcting unit 18.

The inspection processing unit 15 executes an inspection process on the print image formed on the print sheet. For example, the inspection processing unit 15 compares a read image, which is obtained by the reading unit 307 by reading the print image, with a predetermined inspection reference image acquired by referring to the storage unit 14. Then, when a positional displacement that is greater than or equal to a predetermined positional displacement threshold or a color shift that is greater than or equal to a predetermined color shift threshold is detected with respect to the inspection reference image, the print sheet corresponding to the read image is excluded as a defective product. Further, when there are scratches or stains on the print sheet or the print image, the print sheet corresponding to the read image can be excluded as a defective product.

The non-printing time color correction processing unit 16 executes the color correction process on the image forming unit 306 at the non-image forming time. The non-image forming time means the time when the image forming apparatus 103 is not forming an image.

For example, the non-printing time color correction processing unit 16 compares the read image obtained by the reading unit 307 by reading the print image, with a predetermined color correction reference image acquired by referring to the storage unit 14, before the image forming apparatus 103 continuously forms images on a large amount of print sheets. Then, the non-printing time color correction processing unit 16 adjusts a color conversion parameter such as a gamma curve of the image forming unit 306 so that the color of the read image matches the color of the color correction reference image, thereby performing color correction of the image forming unit 306.

The timing of executing the color correction process by the non-printing time color correction processing unit 16, is not limited to a timing before image formation by the image forming apparatus 103, but may be a periodic timing at every predetermined time period.

The printing time color correction processing unit 17 executes the color correction process on the image forming unit 306 at the time of image formation. The time of image formation means the time when image formation is performed by the image forming apparatus 103. The process performed by the printing time color correction processing unit 17 corresponds to so-called real-time color correction.

With respect to the printing time color correction processing unit 17, for example, when the image forming apparatus 103 is continuously forming images on a large amount of print sheets, the reading unit 307 reads the print image of the print sheet immediately after the image formation. Then, the printing time color correction processing unit 17 compares the read image read by the reading unit 307 with a predetermined color correction reference image acquired by referring to the storage unit 14, and adjusts a color conversion parameter such as a gamma curve of the image forming unit 306, so that the color of the read image matches the color of the color correction reference image, thereby correcting the color printed by the image forming unit 306. The image forming apparatus 103 applies the correction result to the image formation onto a print sheet after executing the correction process.

Each of the above-described inspection processing unit 15, the non-printing time color correction processing unit 16, and the printing time color correction processing unit 17 is an example of a process executing unit (a process executor) that executes a predetermined process based on the read image that is obtained, by the reading unit 307, by reading the print image formed on the print sheet.

The reading characteristic correcting unit 18 is an example of a correcting unit (a corrector) that corrects the reading unit 307 based on a read image obtained, by the reading unit 307, by reading a correction chart image formed on a chart sheet fed by the sheet feeding unit 500, and a predetermined read reference image.

Here, the chart sheet is an example of a second recording medium, and the correction chart image is an example of a second image. The chart sheet includes a correction chart image that is formed in advance by the image forming apparatus 103 or another image forming apparatus that is different from the image forming apparatus 103.

When correction is performed by the reading characteristic correcting unit 18, in the image forming apparatus 103, the chart sheet is accommodated in the sheet feeding tray 501 of the sheet feeding unit 500, and the chart sheet is fed to the image forming unit 306 by the sheet feeding unit 500 under the control of the sheet feeding control unit 13.

That is, the image forming apparatus 103 conveys the chart sheet along the conveying path 408 similar to the case where the print sheet is conveyed at the time of image formation, and reads, by the reading unit 307, the correction chart image on the chart sheet that has passed through the position of the fixing roller 405. Note that the chart sheet is manually accommodated in the sheet feeding tray 501, for example, by the user or the administrator of the image forming apparatus 103.

When correction is performed by the reading characteristic correcting unit 18, the image forming unit 306 stops the operation by the stop control unit 12, because a print image is not going to be formed on the chart sheet. Further, when the fixing roller 405 is generating heat, power consumption is wasted, and when the chart sheet passes through the position of the fixing roller 405, the chart sheet will be heated and the correction chart image on the sheet surface may be damaged. Therefore, the image forming apparatus 103 stops the heat generation of the fixing roller 405 by the heat generation stop control unit 121.

Further, the intermediate transfer belt 402 may have residual toner that was not transferred to the print sheet at the time of image formation, and if the chart sheet contacts the residual toner, the correction chart image may be soiled by the residual toner. Therefore, when correction is performed by the reading characteristic correcting unit 18, the image forming apparatus 103 separates the intermediate transfer belt 402 from the conveying path 408 by the separation control unit 122 so that the intermediate transfer belt 402 does not contact the chart sheet conveyed along the conveying path 408.

In this state, the reading unit 307 reads the correction chart image on the chart sheet conveyed along the conveying path 408. The reading characteristic correcting unit 18 compares the read image read by the reading unit 307 with the read reference image acquired by referring to the storage unit 14, and corrects the reading characteristic of the reading unit 307 so that the color of the read image matches the color of the read reference image. For example, the reading characteristic of the reading unit 307 can be corrected by adjusting the gain or offset of each color in the CCD of the reading unit 307.

<Example of Chart Sheet>

Figure 6:
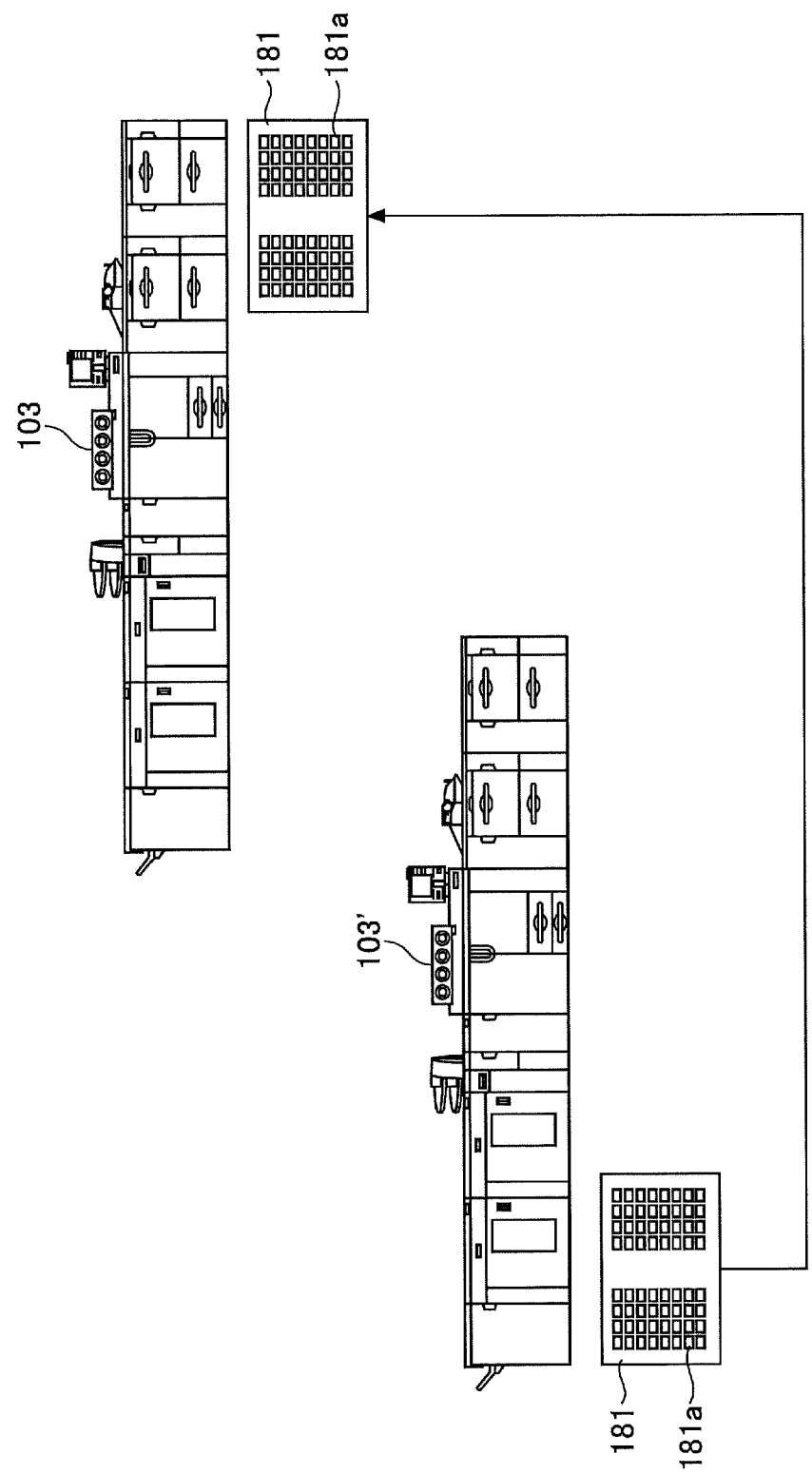
FIG. 6 is a diagram illustrating an example of a chart sheet according to the first embodiment of the present invention.

Next, the chart sheet used for correction by the reading characteristic correcting unit 18 will be described with reference to FIG. 6. FIG. 6 is a diagram illustrating an example of a chart sheet.

An image forming apparatus 103' illustrated in FIG. 6 is another image forming apparatus different from the image forming apparatus 103 according to the embodiment, and is an image forming apparatus that is used as a reference for correcting of the reading characteristics of the reading unit 307 in the image forming apparatus 103.

A chart sheet 181 is a sheet on which a correction chart image 181*a* is formed on the sheet surface by the image forming apparatus 103'. The correction chart image 181*a* is an image in which color patches of a plurality of colors are formed in an array. The color patch means the area where one color is formed on the chart sheet. The number and arrangement of color patches and the type of color or the like may be selected as appropriate depending on the intended purpose.

The image forming apparatus 103' forms the correction chart image 181*a* on the chart sheet 181, reads the correction chart image 181*a* by a reading unit provided in the image forming apparatus 103', and stores the read image as read reference image data in a storage device or the like.

The chart sheet 181 on which the correction chart image 181*a* is formed is carried by a user or an administrator of the image forming apparatus 103, and is set in the sheet feeding tray 501 of the sheet feeding unit 500 in the image forming apparatus 103 at the time of correction of the reading unit 307. The read reference image data is moved to the image forming apparatus 103 through a network or a storage medium, and is stored in the storage unit 14 (see FIG. 5) of the image forming apparatus 103. Thereafter, the correction of the reading unit 307 in the image forming apparatus 103 is performed.

In the present embodiment, an example of forming the correction chart image 181*a* by the image forming apparatus 103' is indicated, but the present invention is not limited thereto. The second recording medium may be a chart sheet on which a correction chart image has been previously formed in the past by the image forming apparatus 103 itself, and the read image obtained by reading such a correction chart image may be used as the read reference image data.

Further, the correction chart image and the read reference image data may be prepared according to the type of image formed by the image forming apparatus 103, such as a photographic image or a text image. In this case, the image type is associated, in advance, with the correction chart image and the read reference image data, and the image forming apparatus 103 uses the correction chart image and the read reference image data according to the image type, when correcting the reading unit 307.

Further, when the number of color patches is large, the correction chart image can be formed by dividing the image onto a plurality of chart sheets. In the image forming apparatus 103, when the correction of the reading unit is to be performed by using a plurality of chart sheets, a plurality of chart sheets are set in the sheet feeding tray 501 and the sheets are sequentially fed by the sheet feeding unit 500.

<Example of Separation of the Intermediate Transfer Belt 402>

Figure 7:
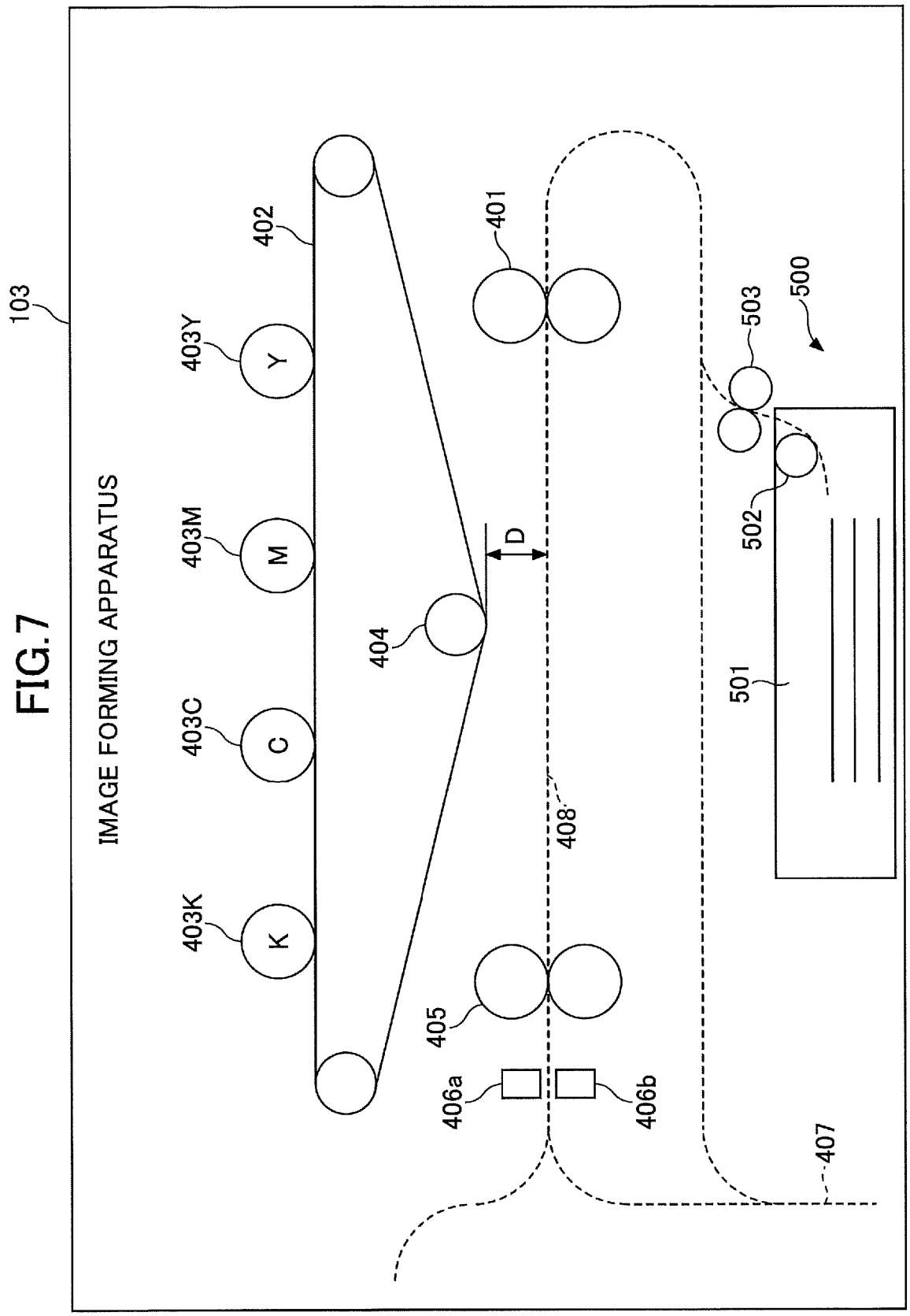
FIG. 7 is a diagram illustrating an example of the separation of an intermediate transfer belt according to the first embodiment of the present invention.

Next, the separation of the intermediate transfer belt 402 will be described with reference to FIG. 7. FIG. 7 illustrates an example of the intermediate transfer belt 402 that is separated from the conveying path 408 under the control of the separation control unit 122 (see FIG. 5).

In FIG. 7, the position of the secondary transfer roller 404 is moved away from the conveying path 408. The secondary transfer roller 404 can be moved by a contact-separation mechanism using an eccentric cam or the like. As a result of movement of the secondary transfer roller 404, the intermediate transfer belt 402 supported by the secondary transfer roller 404 is separated from the conveying path 408 by a distance D. Accordingly, the chart sheet conveyed along the conveying path 408 can be prevented from contacting the intermediate transfer belt 402, and it is possible to prevent the correction chart image from being soiled by residual toner remaining on the intermediate transfer belt 402.

Although FIG. 7 illustrates a configuration in which only the secondary transfer roller 404 moves, in other configurations, the photoconductor drum 403, the secondary transfer roller 404, and the intermediate transfer belt 402 may all be configured to move.

<Example of Correction Operation of the Reading Unit 307 by the Image Forming Apparatus 103>

Figure 8:
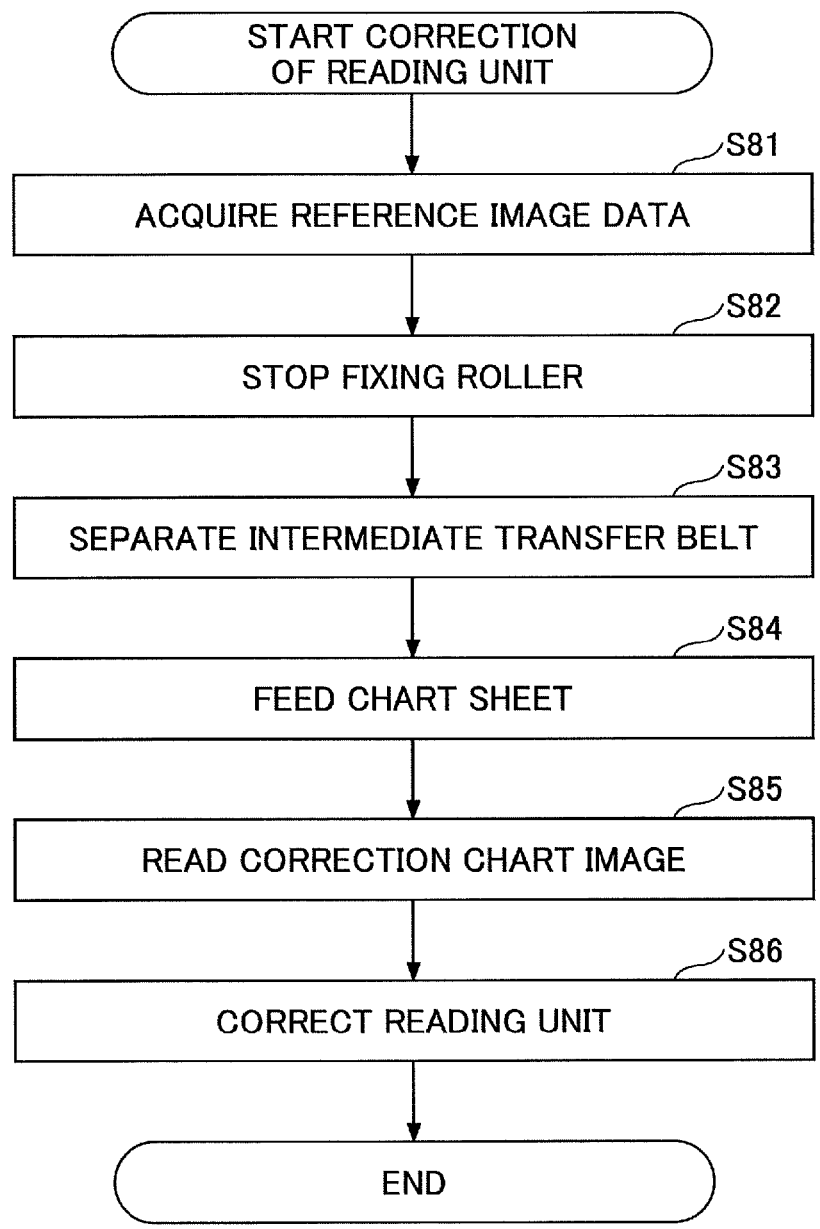
FIG. 8 is a flowchart illustrating an example of a correction operation performed by the image forming apparatus according to the first embodiment of the present invention.

Next, a correction operation of the reading unit 307 by the image forming apparatus 103 will be described with reference to FIG. 8 and also to the functional configuration diagram of FIG. 5, as appropriate. FIG. 8 is a flowchart illustrating an example of a correction operation of the reading unit 307 performed by the image forming apparatus 103.

The image forming apparatus 103 is configured to perform correction of the reading unit 307 at a predetermined timing in the activated state. FIG. 8 illustrates an operation in which the timing at which the image forming apparatus 103 starts the correction of the reading unit 307, is taken as the starting point. The predetermined timing described above can be appropriately selected, such as each time image forming is performed by the image forming apparatus 103, or at each predetermined period.

First, in step S81, the reading characteristic correcting unit 18 acquires the read reference image data by referring to the storage unit 14.

Subsequently, in step S82, the heat generation stop control unit 121 stops the heat generation of the fixing roller 405 (see FIG. 4).

Subsequently, in step S83, the separation control unit 122 separates the intermediate transfer belt 402 from the conveying path 408 on which the print sheets are conveyed.

Subsequently, in step S84, the sheet feeding unit 500 feeds the chart sheet accommodated in the sheet feeding tray 501, under the control of the sheet feeding control unit 13.

Subsequently, in step S85, the reading unit 307 reads the correction chart image formed on the chart sheet that is conveyed along the conveying path 408 (see FIG. 4).

Subsequently, in step S86, the read image obtained by the reading unit 307 is compared with the read reference image acquired by referring to the storage unit 14, and the reading characteristic of the reading unit 307 is corrected so that the color of the read image matches the color of the read reference image.

In this way, the image forming apparatus 103 can correct the reading characteristics of the reading unit 307.

<Effect of the Image Forming Apparatus 103>

Next, an effect of the image forming apparatus 103 will be described. Conventionally, in an image forming apparatus, there is known a technique of executing a process such as inspection of a print image or color correction of the image forming unit based on an image obtained, by a reading unit, by reading a print image formed by the image forming unit. When performing inspection of a print image or when performing correction of the image forming unit, the image forming unit forms a print image on a recording medium fed from a feeding unit, such as a sheet feeding tray, and the reading unit reads the print image immediately after the image formation, by in-line.

In this case, if the reading characteristic of the reading unit changes over time or differs among different image forming apparatuses, the accuracy of the inspection process or the color correction process described above, may be degraded.

On the other hand, in order to compensate for the time-dependent change in the reading characteristic of the reading unit, there is disclosed a configuration for determining the reading characteristic of the reading unit in first and second image forming apparatuses, based on an image obtained, by the second image forming apparatus, by reading the print image formed by the first image forming apparatus.

However, in the disclosed configuration, the reading unit is for reading a print image by using a document platen or ADF. With this configuration, it is not possible to correct a reading unit that is for inspecting a print image or correcting the image forming unit.

In the present embodiment, the image forming apparatus 103 corrects the reading unit based on the read image obtained, by the reading unit, by reading the correction chart image (the second image) formed on the chart sheet (the second recording medium) fed by the sheet feeding unit (the feeding unit), and a predetermined read reference image.

The image forming apparatus 103 uses the correction chart image formed on the chart sheet conveyed from the sheet feeding unit along the conveying path that is used for image formation, similarly to the print sheet (the first recording medium) used for the inspection or color correction, and, therefore, the usage state of the reading unit can be made to be in the same state as that when performing the inspection or color correction. Accordingly, the reading unit can be accurately corrected.

According to the present embodiment, the image forming apparatus 103 prepares, in advance, a chart sheet on which the correction chart image is formed, and corrects the reading unit using the chart sheet. Therefore, the image forming apparatus 103 does not need to form a correction chart image on the chart sheet, every time the correction of the reading unit is performed. Therefore, the image forming apparatus 103 can reduce the labor, time, and cost required for correction of the reading unit.

According to the present embodiment, when the reading unit reads the chart sheet, the image forming apparatus 103 stops the operation of the image forming unit by the stop control unit. Therefore, the image forming apparatus 103 can convey the chart sheet from the sheet feeding unit along the conveying path that is used for image formation.

According to the present embodiment, when the reading unit reads the chart sheet, the image forming apparatus 103 stops the heat generation of the fixing roller (fixing unit). Accordingly, the image forming apparatus 103 saves power consumption for heating the fixing roller, and when the chart sheet passes through the position of the fixing roller, the chart sheet is not heated so that the correction chart image is prevented from being damaged.

According to the present embodiment, when the reading unit reads the chart sheet, the image forming apparatus 103 separates the intermediate transfer belt (image bearer) from the conveying path on which print sheets are conveyed. Therefore, the image forming apparatus 103 can prevent the correction chart image from being soiled by the chart sheet contacting the residual toner adhered to the intermediate transfer belt.

Second Embodiment

Next, an image forming system 100a according to a second embodiment will be described. The same elements as those of the first embodiment are denoted by the same reference numerals, and the overlapping descriptions are omitted as appropriate. This also applies to the other embodiments described below.

Figure 9:
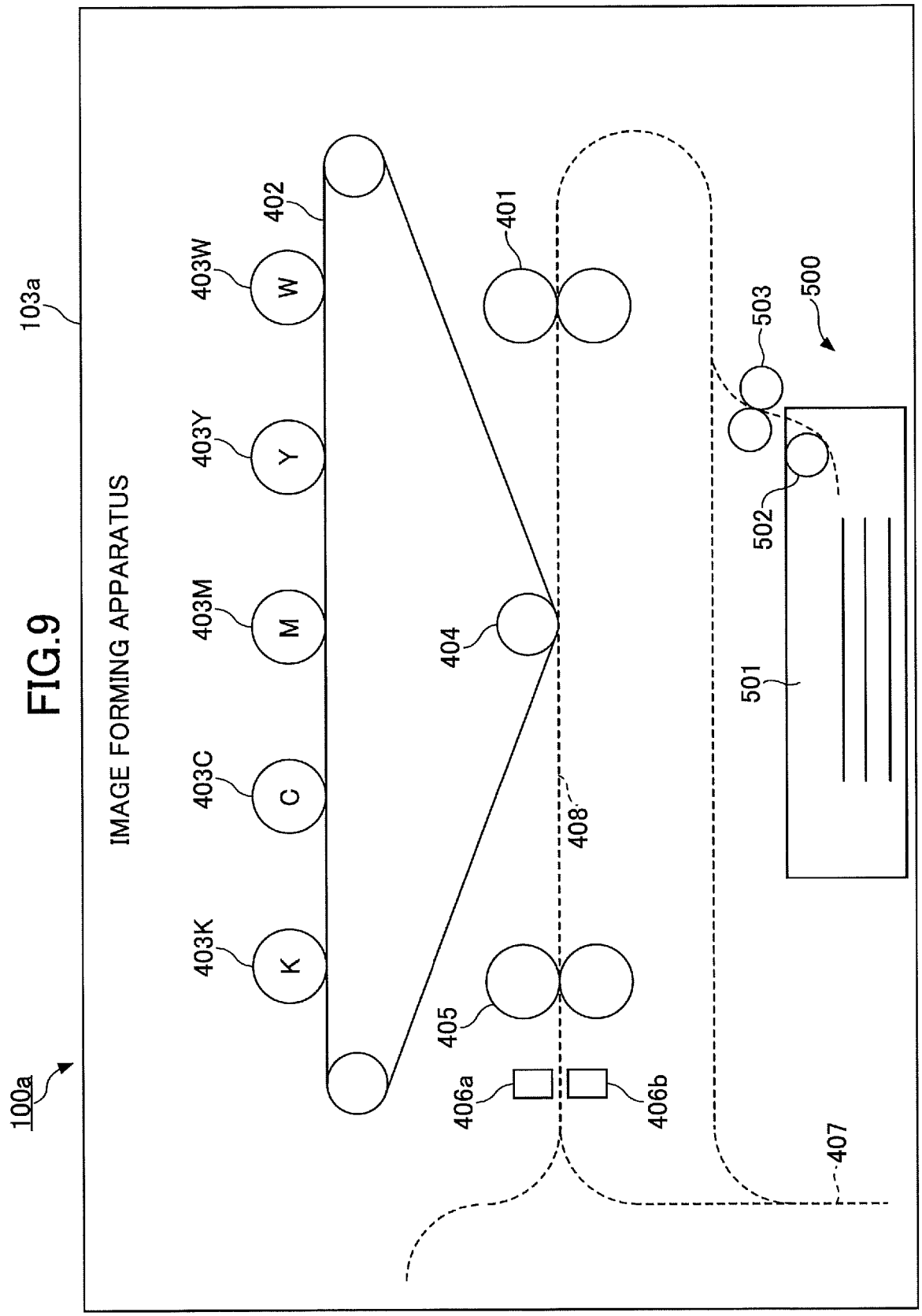
FIG. 9 is a diagram illustrating an example of a configuration of an image forming apparatus according to a second embodiment of the present invention.

FIG. 9 is a diagram illustrating an example of the configuration of an image forming apparatus 103a provided in the image forming system 100a. As illustrated in FIG. 9, the image forming apparatus 103a includes a photoconductor drum 403W in addition to the photoconductor drums 403K, 403C, 403M, and 403Y.

The photoconductor drum 403K can form images with black (K) toner, the photoconductor drum 403C can form images with cyan (C) toner, the photoconductor drum 403M can form images with magenta (M) toner, the photoconductor drum 403Y can form images with yellow (Y) toner, and the photoconductor drum 403W can form images with white (W) toner.

K, C, M, and Y are process colors and are examples of a first color. A process color refers to a color represented by a combination of toners of four basic colors on printed matter. White, on the other hand, is a so-called spot color or solid color, that is a color other than process colors, and is an example of a second color. The image forming apparatus 103a can form an image using toners of a plurality of spot colors other than white, such as fluorescent pink, fluorescent yellow, or the like.

In the case of correcting the reading characteristic of the reading unit with respect to such a spot color, when the correction chart image is formed by the image forming apparatus 103a itself, it is necessary to exchange the photoconductor drum by a number of times corresponding to the number of a plurality of spot colors, and this may be time-consuming and labor-consuming.

In an embodiment, the image forming system 100a prepares, in advance, the chart sheet on which the correction chart image is formed as described above, and corrects the reading unit by using the chart sheet. Accordingly, by preparing in advance a chart sheet on which a correction chart image including a plurality of spot colors is formed, it will not be necessary to exchange the photoconductor drums by a number of times corresponding to the number of spot colors. Accordingly, the image forming system 100a can reduce the labor and time required for correcting the reading unit.

The effects other than the foregoing are the same as those described in the first embodiment.

Third Embodiment

Figure 10:
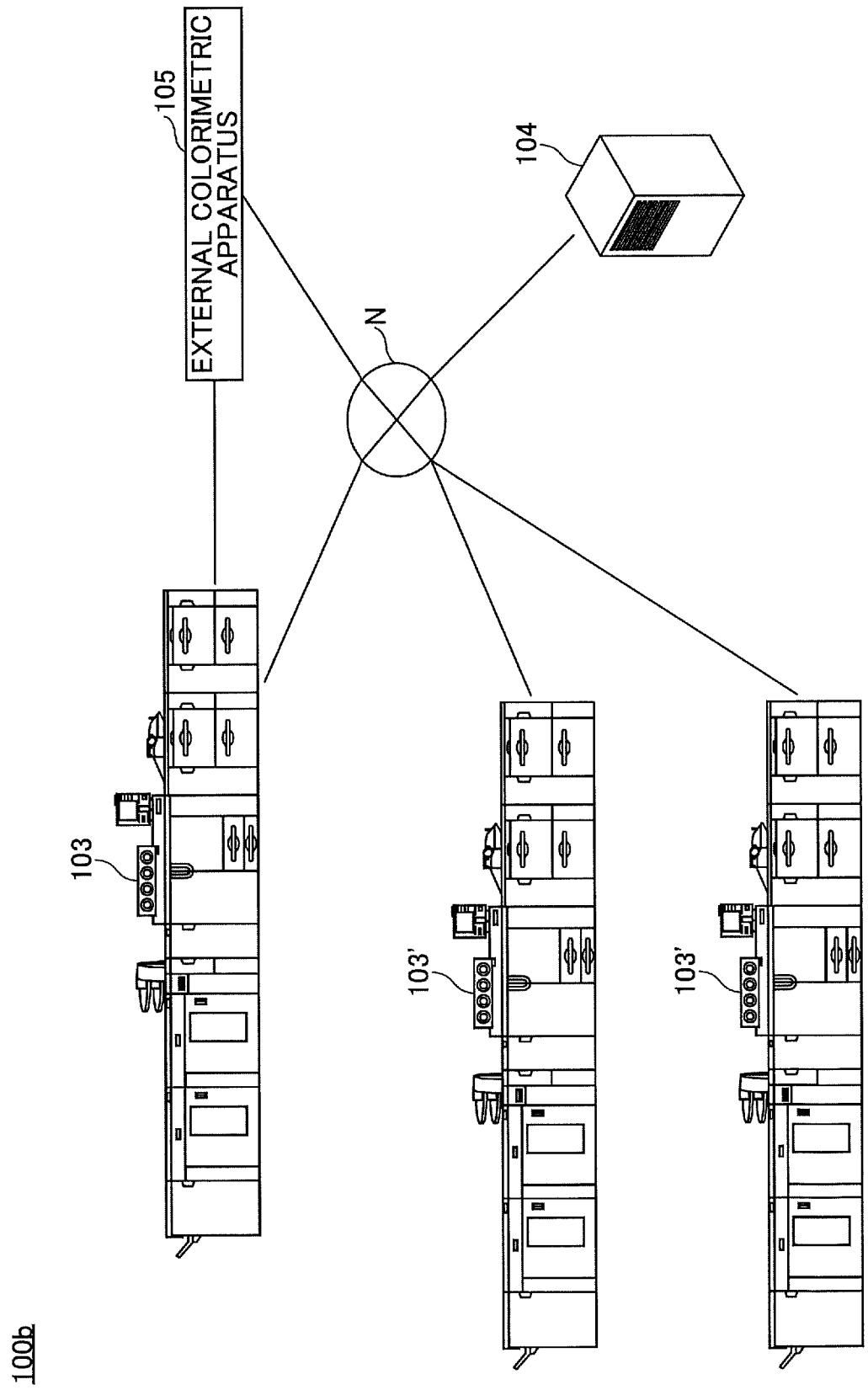
FIG. 10 is a diagram illustrating an example of a configuration of an image forming system according to a third embodiment of the present invention.
Figure 11:
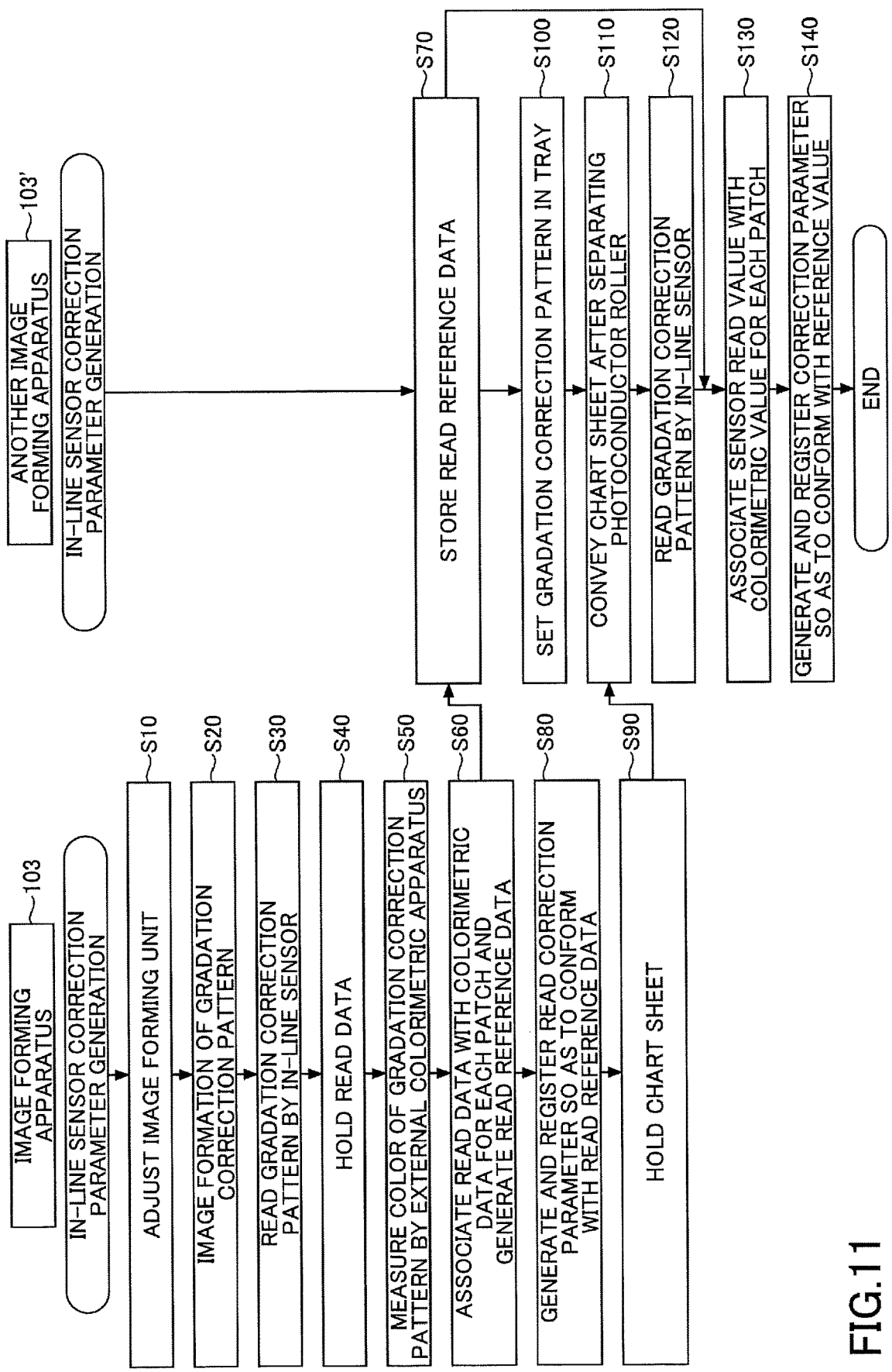
FIG. 11 is a flowchart illustrating an example of a correction operation performed by an image forming system according to the third embodiment of the present invention.

An image forming system 100b according to a third embodiment will be described.
<Configuration of the Image Forming System 100b>
FIG. 10 is a diagram illustrating an example of the configuration of the image forming system 100b. The image forming system 100b includes the image forming apparatus 103, two of the image forming apparatuses 103' corresponding to other image forming apparatuses, and the management server 104. The image forming apparatus 103, the image forming apparatus 103', and the management server 104 are communicably interconnected to each other via a network N. The image forming system 100b is also communicably connected to an external colorimetric apparatus 105 via the network N. The external colorimetric apparatus 105 is, for example, a spectral colorimeter.
<Correction Operation by the Image Forming System 100b>
FIG. 11 illustrates an example of a correction operation of the in-line sensor by the image forming system 100b. FIG. 11 illustrates an operation of the image forming system 100b in which each of the image forming apparatus 103 and the other image forming apparatuses 103' triggers the timing of starting the generation of a correction parameter of the in-line sensor provided in each of these image forming apparatuses. Each of the image forming apparatus 103 and the other image forming apparatuses 103' starts the generation of a correction parameter according to, for example, an operation input by a user.

First, in step S10, the image forming system 100b adjusts the state of the image forming unit 306 included in the image forming apparatus 103, by the image forming apparatus 103.

Subsequently, in step S20, the image forming apparatus 103 of the image forming system 100b forms, on a chart sheet, an image of a gradation correction pattern to be used for correcting the in-line sensor 406 provided in the image forming apparatus 103.

Subsequently, in step S30, the image forming system 100b reads, by the in-line sensor 406 provided in the image forming apparatus 103, the gradation correction pattern formed on the chart sheet.

Subsequently, in step S40, the image forming system 100b holds, in the RAM 203 or the like, the read data that is obtained, by the in-line sensor 406 included in the image forming apparatus 103, by reading the gradation correction pattern.

Subsequently, in step S50, the image forming system 100b performs colorimetric measurement, by the external colorimetric apparatus 105, on the gradation correction pattern formed by the image forming apparatus 103, and holds the colorimetric data. The colorimetric data is the target (reference) for the image forming apparatus 103 itself. Among the image forming apparatuses 103 and 103' included in the image forming system 100b, the image forming apparatus to be the reference uses the colorimetric data when generating the read reference data representing the association between the colorimetric data and the read data read by the in-line sensor. In the image forming apparatuses 103 and 103', the colorimetric data from the external colorimetric apparatus 105 can be input, for example, via the network N or by using a portable recording medium such as a Universal Serial Bus (USB) memory, a secure digital (SD) (registered trademark) card, or the like.

Subsequently, in step S60, the image forming apparatus 103 of the image forming system 100b associates the read data with the colorimetric data for each color patch included in the gradation correction pattern, and generates the read reference data.

The read reference data is data in which read data and colorimetric data are paired. The image forming system 100b stores the read reference data in the HDD/SSD 304 inside the image forming apparatus 103. Alternatively, in step S70, the image forming system 100b transmits the read reference data to the image forming apparatus 103' via the network N and stores the read reference data in the HDD/SSD 304 inside the image forming apparatus 103'. The image forming system 100b may store the read reference data in a storage server apparatus or the like independent of the image forming apparatuses 103 and 103'.

Among the read reference data, the image forming apparatus 103' does not use the read data of the in-line sensor 406 included in the image forming apparatus 103. The image forming apparatus 103' uses the read reference data to retain the data set to be the reference, or to make a comparison at the time of verifying the accuracy of the correction parameter.

Subsequently, in step S80, the image forming system 100b generates a correction parameter for correcting the in-line sensor 406 included in the image forming apparatus 103, so as to match either the read reference data generated in step S60 or the read reference data generated in advance, and registers the generated correction parameter.

Subsequently, in step S90, the image forming system 100b holds, by the image forming apparatus 103, the chart sheet on which the gradation correction pattern has been formed in step S20. In this case, holding the chart sheet means that the chart sheet is stored.

Subsequently, in step S100, the chart sheet held in step S90 is set (accommodated) in the sheet feeding tray 501 included in the image forming apparatus 103'. By setting the chart sheet on which an image has already been formed, in the sheet feeding tray 501 of the image forming apparatus 103' that is to be corrected, there will be no need for the image forming apparatus 103' to form an image of the gradation correction pattern on the chart sheet. With respect to spot color toner, such as mainly white, it takes a long time to install or exchange the photoconductor drum 403W for the spot color. Thus, by eliminating the need for the procedure of forming an image of the gradation correction pattern on the chart sheet, the man-hours can be significantly reduced.

Subsequently, in step S110, the image forming apparatus 103' of the image forming system 100b causes the photoconductor drum 403' of the image forming apparatus 103' to be separated from the intermediate transfer belt 402 by the image forming apparatus 103', and then conveys the chart sheet from the sheet feeding tray 501 of the image forming apparatus 103'.

Subsequently, in step S120, the image forming system 100b reads the gradation correction pattern on the conveyed chart sheet, by the in-line sensor 406 included in the image forming apparatus 103'.

Subsequently, in step S130, the image forming system 100b associates the read data read by the in-line sensor 406 included in the image forming apparatus 103', with the read reference data stored in step S70. In this association, the image forming apparatus 103' further associates the read data obtained by the in-line sensor 406 included in the image forming apparatus 103', with the read data obtained by the in-line sensor 406 of the image forming apparatus 103 and the colorimetric data obtained by the external colorimetric apparatus 105.

Subsequently, in step S140, the image forming apparatus 103' of the image forming system 100*b* generates a correction parameter of the in-line sensor 406 included in the image forming apparatus 103' so as to match the read reference data, and registers the generated correction parameter.

As described above, the image forming system 100*b* can generate a correction parameter of the in-line sensor 406 included in the image forming apparatus 103 and a correction parameter of the in-line sensor 406 included in the image forming apparatus 103'. These correction parameters can also be used to correct each of the in-line sensors 406.

<Example of Read Reference Data>

FIG. 12 is a diagram illustrating an example of read reference data in which the read data generated in step S60 in the operation of FIG. 11 is associated with the colorimetric data. That is, FIG. 12 illustrates the read reference data generated by the image forming apparatus 103.

FIG. 13 is a diagram illustrating an example of read reference data in which the read data generated in step S130 in the operation of FIG. 11 is associated with the colorimetric data. That is, FIG. 13 illustrates the read reference data generated by the image forming apparatus 103'.

<Example of Correction Operation Screen>

Figure 14:
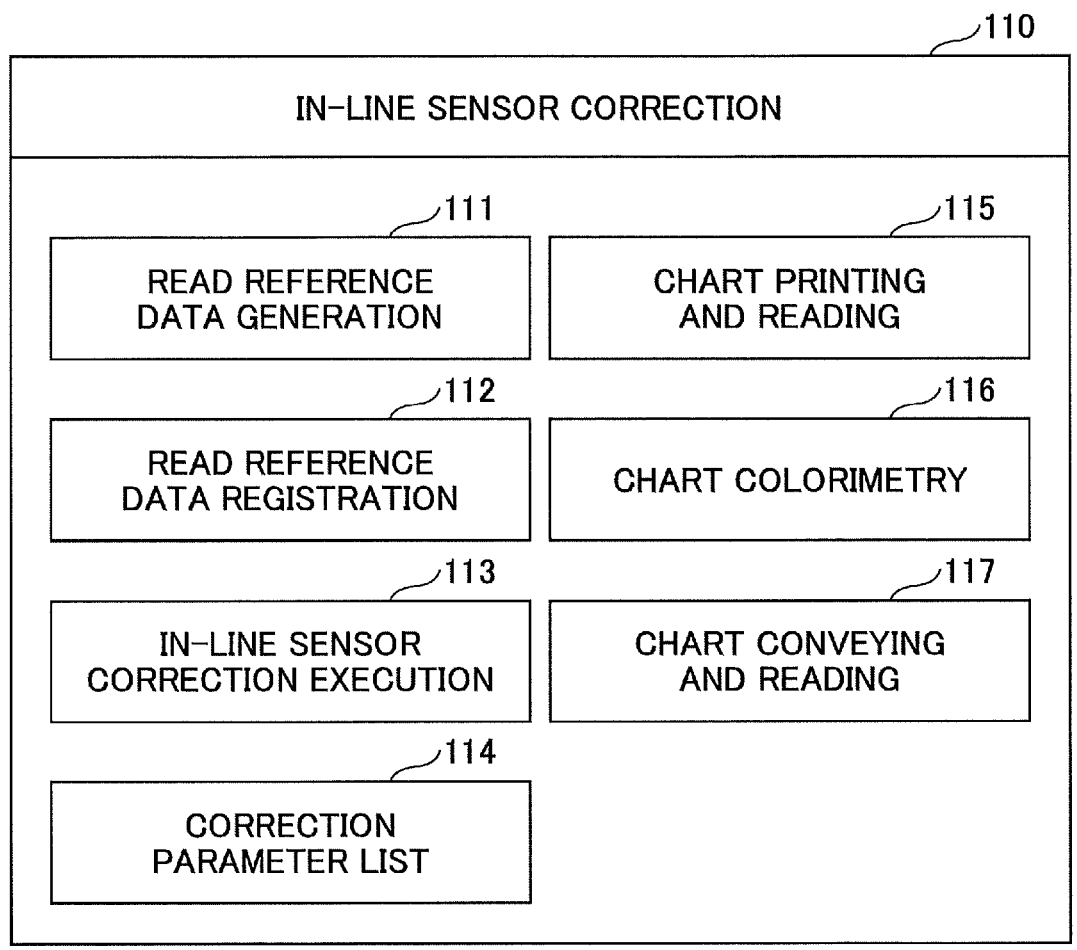
FIG. 14 is a diagram illustrating an example of a correction operation screen of an in-line sensor according to the third embodiment of the present invention.

FIG. 14 is a diagram illustrating an example of a correction operation screen 110 of the in-line sensor included in the image forming apparatuses 103 and 103' included in the image forming system 100*b*. The correction operation screen 110 is a screen displayed on at least one of the operation panels of the image forming apparatuses 103 and 103' and allows operation input by a user.

As illustrated in FIG. 14, the correction operation screen 110 includes a read reference data generation button 111, a read reference data registration button 112, an in-line sensor correction execution button 113, a correction parameter list button 114, a chart printing and reading button 115, a chart colorimetry button 116, and a chart conveying and reading button 117.

The read reference data generation button 111 is a button for executing the operation of steps S10 to S60 in the correction operation illustrated in FIG. 11. When this button is pressed, the image forming apparatus 103 forms an image of a gradation correction pattern on a chart sheet, reads the formed gradation correction pattern by the in-line sensor 406, performs colorimetric measurement on the gradation correction pattern by the external colorimetric apparatus 105, and then generates read reference data.

The read reference data registration button 112 is a button for importing and registering, into the image forming apparatus 103, the read data acquired by the in-line sensor 406 at the time of image design in the image forming apparatus 103, the colorimetric data measured by the external colorimetric apparatus 105, and the read reference data.

The in-line sensor correction execution button 113 is a button for executing the operations of steps S10 to S90 in the correction operation illustrated in FIG. 11. When this button is pressed, the image forming apparatus 103 forms an image of a gradation correction pattern on a chart sheet, reads the formed gradation correction pattern by the in-line sensor 406, and performs colorimetric measurement on the gradation correction pattern by the external colorimetric apparatus 105. The reading order of the read data of the in-line sensor 406 and the reading order of the colorimetric data of the external colorimetric apparatus 105 are different, and the color patches are not arranged in the gradation order. Therefore, for each color patch ID, the read data and the colorimetric data are associated with each other and are sorted into the order of IDs. Thereafter, the image forming apparatus 103 generates a correction parameter that matches the registered read reference data based on the acquired information, and registers the generated correction parameter.

The correction parameter list button 114 is a button for displaying a list of correction parameters held in each of the image forming apparatuses 103 and 103' included in the image forming system 100*b*. The correction parameter list button 114 is used to perform correction parameter analysis performed when the color accuracy evaluation after generating the correction parameter becomes NG, to perform cause analysis when a failure occurs in the market, to reinstall the correction parameter in the image forming apparatus as provisional information at the time of suddenly exchanging a component in the image forming apparatus 103 or the image forming apparatus 103', or the like.

When there is more than one image forming apparatus that performs correction using the read reference data, the image forming system 100*b* generates a different correction parameter for each of the plurality of image forming apparatuses. The list of correction parameters for the respective image forming apparatuses 103 and 103' that can be viewed by pressing the correction parameter list button 114, corresponds to the list with respect to the image forming apparatuses illustrated in FIG. 13. When there are a plurality of image forming apparatuses, data sets corresponding to the number of the image forming apparatuses are added to the list in FIG. 13.

The chart printing and reading button 115 is a button for executing the operations of steps S10 to S40 in the correction operation illustrated in FIG. 11. When this button is pressed, the image forming apparatus 103 forms an image of a gradation correction pattern necessary for correction on the chart sheet. When generating a correction parameter for a spot color such as white, it takes a long time to set or exchange the photoconductor drum or the like for the spot color in the image forming apparatus. On the other hand, the operation of the image forming system 100*b*, which is performed in response to the chart printing and reading button 115 being pressed, enables the generation of a correction parameter for a spot color without the need of performing the above-described setting or exchanging operation at the other image forming apparatus 103'.

The chart colorimetry button 116 is a button for executing the operation of steps S10 to S30 in the correction operation illustrated in FIG. 11. When this button is pressed, the external colorimetric apparatus 105 becomes capable of performing colorimetric measurement of the gradation correction pattern. The chart colorimetry button 116 is used when evaluating the density of the gradation correction pattern or when updating the colorimetric data by storing the chart sheet, or the like.

The chart conveying and reading button 117 is a button for executing the operation of step S70 and steps 100 to S140 in the correction operation illustrated in FIG. 11 in response to the chart conveying and reading button 117 being pressed.

The image forming apparatus, the information processing apparatus, and the recording medium are not limited to the specific embodiments described in the detailed description, and variations and modifications may be made without departing from the spirit and scope of the present invention.

The image forming system 100 may be configured by providing, in an external apparatus, part of the functions of the image forming apparatus 103 or part or all of functions of the DFE 102. An external apparatus includes a cloud server or the like. Alternatively, the DFE 102 may include a part of the functions provided in the image forming apparatus 103.

In addition to the image forming apparatus, when a post-processing apparatus for performing an inspection process or a color correction process is provided at the subsequent stage of the image forming apparatus, a part of the functions provided in the image forming apparatus 103 may be provided in the post-processing apparatus.

In the above-described embodiment, the image forming system including the image forming apparatus of an electrophotographic method has been described. However, the present invention is also applicable to an image forming system including an image forming apparatus of another method such as an inkjet method.

Further, the ordinal numbers, values of quantities, or the like used in the description of the embodiments are all exemplified for the purpose of specifically describing the technology of the present invention, and the present invention is not limited to the exemplary numbers. The connection relationship between the elements is exemplified for the purpose of specifically describing the technology of the present invention, and the connection relationship for implementing the functions of the present invention is not limited thereto.

Further, in the functional block diagram, the division of the blocks is an example; a plurality of the blocks may be implemented as one block, each block may be divided into two or more blocks, and/or some functions may be transferred to other blocks. The functions of multiple blocks with similar functions may be processed in parallel or by time division by a single piece of hardware or software.

The embodiment also includes a program. For example, the program is used in an image forming apparatus including an image forming unit that forms a first image on a first recording medium, a feeding unit that is capable of feeding the first recording medium to the image forming unit, a reading unit that reads the first image formed on the first recording medium, and a processing execution unit that executes a predetermined process based on a read image obtained, by the reading unit, by reading the first image. The program causes a computer to execute a process of correcting the reading unit based on the read image obtained, by the reading unit, by reading a second image formed on a second recording medium fed by the feeding unit, and a predetermined read reference image. By such a program, the same effects as those of the above-described image forming system can be obtained.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to an embodiment of the present invention, the reading unit can be accurately corrected.

What is claimed is:

1. An image forming apparatus comprising:
    an image former configured to form a first image on a first recording medium;
    a feeder configured to feed the first recording medium to the image former;
    a reader configured to read the first image formed on the first recording medium;
    a process executor configured to execute a predetermined process based on a first read image that is obtained by the reader by reading the first image;
    a controller; and
    a corrector, wherein
    the image former comprises a transfer belt that transfers the first image to the first recording medium on a conveying path,
    the reader reads a second image that is formed on a second recording medium fed by the feeder and conveyed on the conveying path,
    the controller causes the transfer belt to be separated from the second recording medium on the conveying path, and
    the corrector is configured to correct the reader based on a second read image that is obtained from the second image read by the reader and a predetermined read reference image.

2. The image forming apparatus according to claim 1, wherein the predetermined process is at least one of an inspection process of inspecting the first image, a color correction process performed on the image former at a time of non-image formation, and a color correction process performed on the image former at a time of image formation.

3. The image forming apparatus according to claim 1, further comprising:
    an accommodator configured to accommodate the first recording medium, wherein
    the feeder feeds the second recording medium accommodated in the accommodator.

4. The image forming apparatus according to claim 1, further comprising:
    the controller stops an operation of the image former when the reader reads the second image.

5. The image forming apparatus according to claim 4, wherein
    the image former includes a fixer configured to thermally fix the first image on the first recording medium, and
    the controller stops heat generation by the fixer.

6. The image forming apparatus according to claim 1, wherein the image former performs image formation with a first color and a second color that is different from the first color.

7. The image forming apparatus according to claim 6, wherein
    the first color is a process color, and
    the second color is a color other than the process color.

8. The image forming apparatus according to claim 1, wherein
    the second recording medium includes a gradation correction pattern formed by another image forming apparatus that is different from the image forming apparatus, and
    the corrector corrects the reader based on read data that is obtained by the reader by reading the gradation correction pattern formed on the second recording medium fed by the feeder.

9. The image forming apparatus according to claim 8, wherein the corrector corrects the reader based on colorimetric data that is obtained by an external colorimetric apparatus by performing colorimetric measurement on the gradation correction pattern formed on the second recording medium, and the read data that is obtained by the reader by reading the gradation correction pattern formed on the second recording medium.

10. The image forming apparatus according to claim 9, wherein the corrector corrects another reader included in the another image forming apparatus, based on read data that is obtained by the another reader by reading the gradation correction pattern formed on the second recording medium, and the calorimetric data that is obtained by the external colorimetric apparatus by performing the colorimetric measurement on the gradation correction pattern formed on the second recording medium.

11. The image forming apparatus according to claim 10, wherein the corrector corrects at least one of the reader and the another reader, based on read reference data in which the colorimetric data that is obtained by the external calorimetric apparatus by performing the calorimetric measurement on the second recording medium is associated with the read data that is obtained by the reader by reading the second recording medium, and the read data that is obtained by reading the second recording, medium.

12. An information processing apparatus that is attachable to an image forming apparatus, wherein
  the image forming apparatus comprises:
    an image former configured to form a first image on a first recording medium; and
    a feeder configured to feed the first recording medium to the image former, the information processing apparatus comprises:
    a reader configured to read the first image formed on the first recording medium;
    a process executor configured to execute a predetermined process based on a first read image that is obtained by the reader by reading the first image;
    a controller; and
    a corrector, wherein
  the image former comprises a transfer belt that transfers the first image to the first recording medium on a conveying path,
  the reader reads a second image that is formed on a second recording medium fed by the feeder and conveyed on the conveying path,
  the controller causes the transfer belt to be separated from the second recording medium on the conveying path, and
  the corrector is configured to correct the reader based on a second read image that is obtained from the second image read by the reader and a predetermined read reference image.

13. A non-transitory computer-readable recording medium storing a program that causes a computer to execute a process performed in an image forming apparatus,
  the image forming apparatus comprising:
    an image former configured to form a first image on a first recording medium;
    a feeder configured to feed the first recording medium to the image former;
    a reader configured to, read the first image formed on the first recording medium;
    a controller; and
    a process executor configured to execute a predetermined process based on a first read image that is obtained by the reader by, reading the first image, wherein
  the image former comprises a transfer belt that transfers the first image to the first recording medium on a conveying path, and
  the process comprises:
    reading, with the reader, a second image that is formed on a second recording medium fed by the feeder and conveyed on the conveying path;
    causing, with the controller, the transfer belt to be separated from the second recording medium on the conveying path; and
    correcting the reader based on a second read image that is obtained from the second image read by the reader and a predetermined read reference image.

* * * * *